Patented Aug. 19, 1952

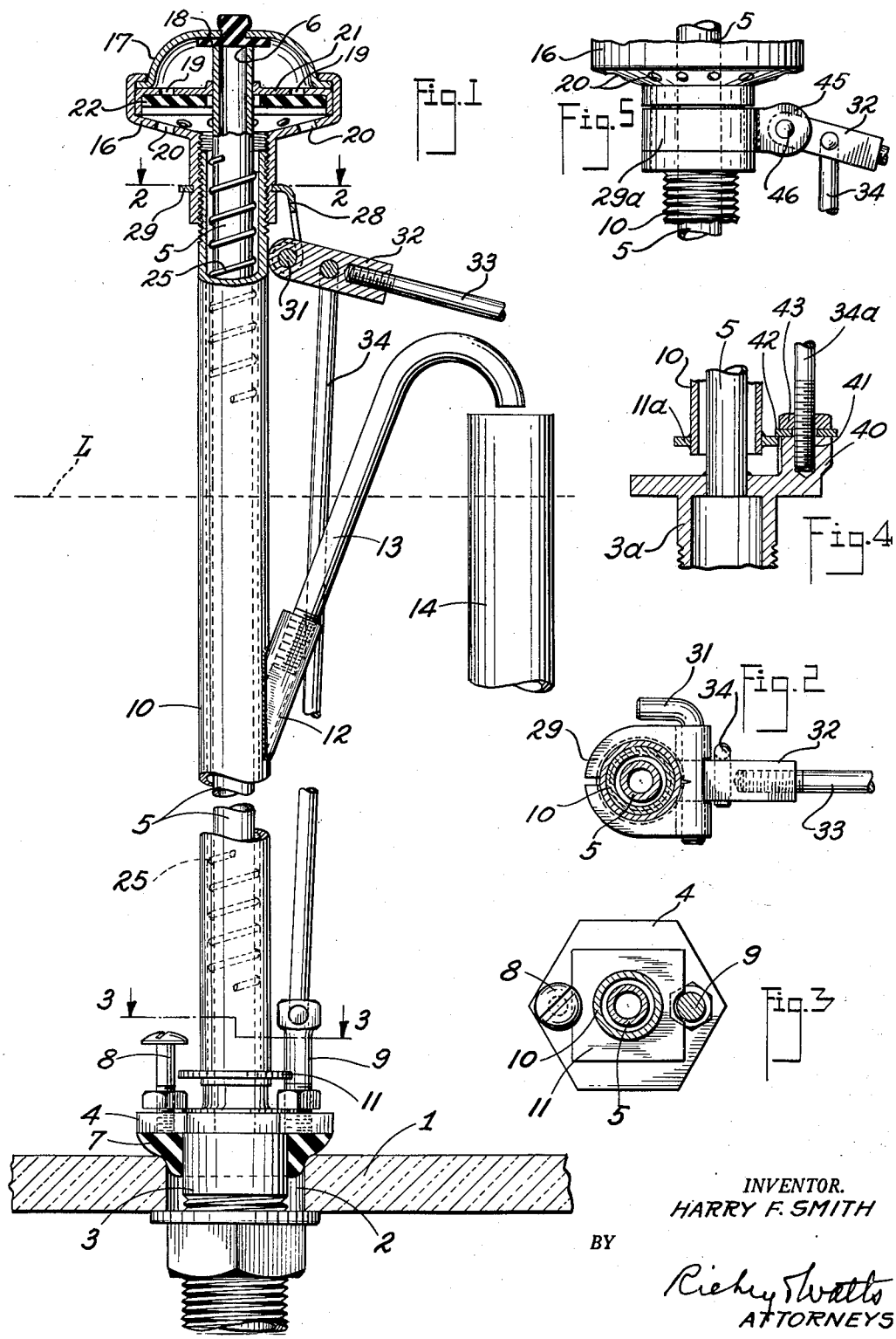

2,607,364

UNITED STATES PATENT OFFICE 2,607,364

INLET VALVE FOR FLUSH TANKS

Harry F. Smith, Lexington, Ohio, assignor to Mansfield Sanitary Pottery, Inc., Perrysville, Ohio, a corporation of Ohio Application July 27, 1949, Serial No. 107,072

6 Claims. (Cl. 137—218)

This invention relates generally to inlet valves of the hush pipe type for flush tanks and is particularly concerned with a modification of the apparatus shown in my copending application Serial No. 61,646, filed November 23, 1948, which application is a continuation-in-part of application Serial No. 608,408, filed August 2, 1945, and now abandoned.

In the apparatus of the just mentioned application, adjustment of the valve housing up or down on the hush pipe has the effect of raising or lowering the surface level of water in the tank. Screwing the float rod in its supporting lever away from or toward the bracket has the effect of increasing or decreasing the extent of opening of the valve.

In the present invention, movement of the housing along the hush pipe respectively increases and decreases the extent of opening of the valve while movement of the float lever pivot away from or toward the seat at the open end of the inlet pipe respectively raises or lowers the surface level of liquid in the tank. Thus the present invention obtains the advantages of my prior device in a new combination of parts which includes certain parts of my prior apparatus and certain new parts and which has a new mode of operation.

The present invention will be better understood by those skilled in the art from a consideration of the following description, together with the accompanying drawings, in which:

Fig. 1 is a vertical, sectional view, partly in elevation, through one modification of this invention;

Figs. 2 and 3 are plane views, partly in section, taken on lines 2—2 and 3—3, respectively, of Fig. 1;

Fig. 4 is a vertical, sectional view of a modified form of nipple stop and anchor; and Fig. 5 is a side elevational view of a modified form of collar.

In Figs. 1, 2 and 3 the bottom wall 1 of a flush tank is shown as having an opening 2 through which an inlet pipe extends. This pipe includes a threaded nipple 3 positioned in the hole 2 and having a flange 4 inside the tank and a pipe 5 of smaller diameter than the nipple extending upwardly therefrom and having a valve seat 6 at its open upper end. A gasket 7 is interposed between flange 4 and the tank wall 1 to seal opening 2 against leakage of water therethrough. A stop screw 8 is adjustably positioned on flange 4 and an adjustable anchor 9 is carried by the flange 4 opposite stop screw 8.

Hush pipe 10 surrounds pipe 5, is provided with a flange 11 at its lower end to engage the underside of the head of stop screw 8, and is cut away at the opposite side so as partly to surround anchor 9 (Fig. 3) and to be restrained thereby from rotation about pipe 5, and is guided by them and the wire about pipe 5 to move endwise concentrically with the inlet pipe. Between its ends hush pipe 10 has a tube connection 12 into which a refill tube 13 may be screwed to conduct water into the refill pipe 14.

At its upper end hush pipe 10 carries a valve housing which has threaded connection with the hush pipe and may be adjusted to various positions on the pipe by being rotated in the appropriate direction. This housing consists of a lower shell 16 which is threaded to the hush pipe, a dome-shaped top shell 17 which carries a valve 18 to bear on the valve seat 6 and close the inlet pipe against flow of water therethrough and a plate 19 which extends transversely of the inlet pipe, and has an inner edge flange to engage slidably with that pipe and an outer peripheral flange to bear against an opposed part of the lower shell. The lower shell 16 has a plurality of holes 20 extending therethrough and into the chamber between the lower shell and the plate 19 and plate 19 has a plurality of holes 21 extending therethrough to connect the chamber between the plate 19 and dome 17 with the chamber beneath plate 19. A ring 22, preferably composed of flexible or deformable material, such, for example, as natural or synthetic rubber or the like, is positioned within the valve housing beneath plate 19. At its outer periphery it bears against the cylindrical peripheral flange on plate 19 and at its inner periphery is spaced a short distance from the outer surface of inlet pipe 5. When the valve 18 is moved away from seat 6 and water is permitted to flow through the inlet pipe 5, it moves ring 22 away from holes 21 and into position covering holes 20 and flows into the lower chamber in the valve housing and thence down between the inlet and hush pipes and eventually is discharged at the lower end of the hush pipe.

A spring wire 25 is coiled around inlet pipe 5 and preferably is attached at one end thereto. This wire closely engages the outer surface of the inlet pipe and is spaced a short radial distance from the inner surface of hush pipe 10. Water flowing down the hush pipe and encountering the wire 25 will, in effect, be divided into two streams, i. e., one being tape like and flowing spirally around the inlet pipe between the turns of the spring wire, and the other one being substantially tubular and flowing along the inner surface of the hush pipe outside of the spring wire. These two streams move at an angle to one another and intercept one another with resultant turbulence, decrease in velocity and reduction in noise when the water is discharged from the lower end of the hush pipe. Additionally, the spring wire 25 acts as a guide for the hush pipe in its axial movements relative to the inlet pipe.

A collar plate 28 is operatively associated with the neck of the valve housing. It comprises a split portion 29 seated in an annular recess in the lower end portion of shell 16 and an ear portion which carries a hinge pin 31 to which is pivoted one end of a float rod fitting 32. The other end of this fitting is attached to an end portion of float rod 33 which carries at its other end portion a float ball (not shown). A strut 34 has its lower end fixed in position as by being extended through a hole in anchor 9 while its upper end 35 extends into a hole in float rod fitting 32. This upper end 35 serves as a pivot on which that fitting may turn. Since the strut 34 is attached at its lower end to the inlet pipe, this pivot-forming upper portion 35 of the strut is fixed relative to the valve seat 6 of the inlet pipe. The position of this pivot part 35 of strut 34 may be varied by adjustment of anchor 9 in flange 11. The effect of raising or lowering the pivot portion of strut 34 as by adjustment of anchor 9 vertically is to bring that pivot portion higher or lower with respect to valve seat 6; and the effect of such movement is to raise or lower the surface level of water in the tank at which the valve closes.

The manner of varying the extent of opening of the valve is by adjusting the valve housing on the hush pipe. As that housing is screwed up on the hush pipe valve 18 is moved away from seat 6 and as a result the extent of valve opening is increased. When the housing is screwed down on the hush pipe the valve 18 is moved toward seat 6 and the extent of valve opening is reduced. By these adjustments the valve is moved respectively away from and toward the valve seat and the pivot portion 35. Thus control of the extent of the valve opening is independent of the surface of water level in the tank.

It will be understood that when the flush valve is opened with resultant lowering of water level in the tank, fitting 32 is pivoted about pivot 35 of strut 34 and lifts the valve housing. When the water level lifts the float ball, fitting 32 pivots in the opposite direction with resultant downward movement of the valve housing and closing of the valve. When the valve is closed, ring 22 returns to the position shown in Fig. 1 thereby uncovering holes 20 and effectively preventing any back flow of water from the tank into the inlet pipe in case of failure of pressure in the latter.

In Fig. 4 is shown a modified form of the nipple, stop and anchor of Fig. 1. A stud 40 extends upwardly from, and is integral with, nipple 3a. This stud has a vertical, tapped hole 41 into which the lower end of strut 34a is threaded. The flange 11a at the lower end of hush pipe 10 is cut away to cooperate with opposite sides of stud 40 to permit axial non-rotational movement of the hush pipe relative to the stud. A washer 42 and nut 43 serve to secure the strut in fixed position. The stud nut and washer serve not only as a stop to limit the extent of upward motion of the hush pipe but also as an adjustable anchor for the strut.

In Fig. 5 is shown a modified form of collar. It comprises a portion 29a which encircles the lower portion of the housing and lies in an annular recess and a portion including ears 45 carrying a pin 46 on which one end of fitting 32 may pivot.

It will be noted that the float arm and operating lever are attached to the valve body and not to the hush pipe, as contrasted with their attachment to the hush pipe as shown in my copending application, Serial No. 61,647. The differences in adjustments referred to hereinabove are the result of these different points of attachment.

Subject matter shown but not claimed in this application is being claimed in one or another of the following applications: Serial No. 759,064, filed July 5, 1947, now Patent No. 2,598,195 of May 27, 1952; Serial No. 61,646, filed November 23, 1948; and Serial No. 107,073, filed July 27, 1949.

Having thus described the present invention so that others skilled in the art may be able to understand and practice the same, I state that what I desire to secure by Letters Patent is defined by what is claimed.

What is claimed is:

1. In a flush tank, an inlet pipe having a valve seat at one end, a float-carrying lever pivotally mounted between its ends on a pivot positioned a fixed distance from said seat, a member pivoted to said lever, a hush pipe around said inlet pipe, a housing carrying a valve to engage said seat and connected to said hush pipe for circumferential and endwise shifting movement thereon, said housing loosely engaging said member for rotational movement without substantial axial movement relative thereto and stop means engageable with said hush pipe and limiting endwise movement thereof in valve unseating direction.

2. In a flush tank, an inlet pipe having a valve seat at one end, a float-carrying lever pivotally mounted between its ends on a pivot positioned a fixed distance from said seat, a collar pivoted to said lever, a hush pipe around said inlet pipe, a housing carrying a valve to engage said seat and connected to said hush pipe for circumferential and endwise shifting movement thereon, said housing being within and loosely engaging said collar for rotational movement without substantial axial movement relative thereto, and a stop engageable with said hush pipe to limit the endwise movement thereof and the movemnt of said valve away from said seat.

3. In a flush tank, an inlet pipe having a valve seat at one end, a float-carrying lever pivotally mounted between its ends on a pivot positioned a fixed distance from said seat, a member pivoted to said lever, a hush pipe around said inlet pipe, a housing carrying a valve to engage said seat and connected to and shiftable circumferentially and endwise on said hush pipe, said housing loosely engaging said member for rotational movement without substantial axial movement relative thereto, and stop means engaging said hush pipe and limiting its rotational movement and its endwise movement in valve unseating direction.

4. In a flush tank, an inlet pipe having a valve seat at one end, a hush pipe around said inlet pipe, means limiting endwise and rotational movement of the hush pipe, a strut having a pivot-like portion positioned at a fixed distance from said seat, a lever pivotally mounted between its ends on said pivot-like portion of the strut, a float on one end of said lever and a member pivoted to the other end of said lever, and a housing carrying a valve to engage said seat and connected to and shiftable circumferentially and endwise on said hush pipe, said housing within and loosely engaging said member for rotational movement without substantial axial movement relative thereto.

5. In a flush tank, an inlet pipe having a valve seat at one end, a hush pipe around said inlet pipe, means engageable with said hush pipe for limiting the extent of its endwise and rotational movement, a strut carrying a pivot positioned at a fixed distance from said seat, a float lever pivotally mounted between its ends on said pivot, a collar pivoted to said lever, and a housing carrying a valve to engage said seat and connected to and shiftable circumferentially and endwise on said hush pipe, said collar loosely surrounding said housing for free rotational movement of the latter without substantial axial movement relative to the collar.

6. In a flush tank, an inlet pipe having a valve seat at one end, a float-carrying lever pivotally mounted between its ends on a pivot positioned a fixed distance from said seat, a member pivoted to said lever, a hush pipe around said inlet pipe, a housing connected to one end of said hush pipe for circumferential and endwise movement thereon, a valve connected to said housing to engage said seat, a syphon-breaking valve in said housing above the predetermined water level in the tank, said housing loosely engaging said member for rotational movement without substantial axial movement relative thereto, and stop means limiting rotational and endwise movement of said hush pipe.

HARRY F. SMITH.

REFERENCES CITED

The following references are of record in the file of this patent:

UNITED STATES PATENTS

| Number | Name | Date |
| --- | --- | --- |
| 655,233 | Heuck | Aug. 7, 1900 |
| 1,294,908 | Hill | Feb. 18, 1919 |
| 1,313,797 | Demilt | Aug. 19, 1919 |
| 1,368,884 | Bozeman | Feb. 15, 1921 |
| 1,606,274 | Utley | Nov. 9, 1926 |
| 1,649,620 | Siefen | Nov. 15, 1927 |
| 2,086,646 | Stebbins | July 13, 1937 |
| 2,367,951 | Lewis | Jan. 23, 1945 |
| 2,430,152 | Wiley | Nov. 4, 1947 |
| 2,444,958 | Smith | July 13, 1948 |